J. W. NIPPERT.
NUT LOCK.
APPLICATION FILED NOV. 16, 1912.
1,079,714.
Patented Nov. 25, 1913.
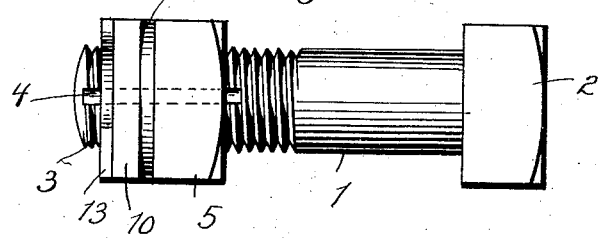
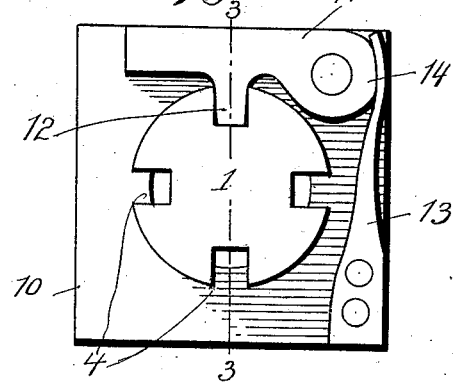
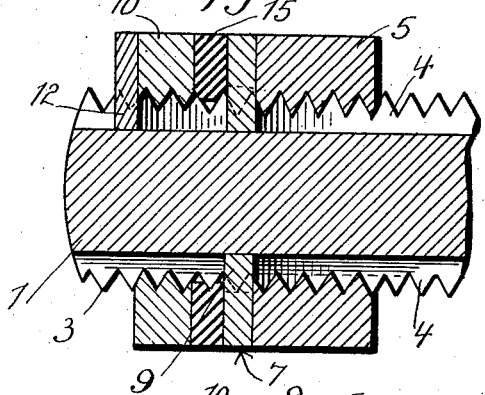
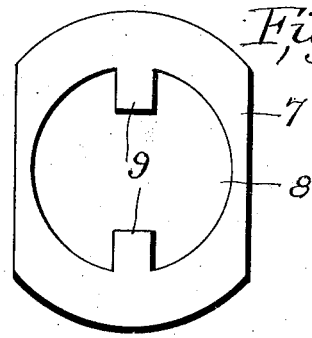
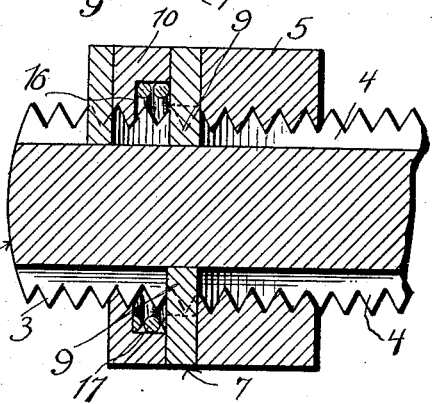
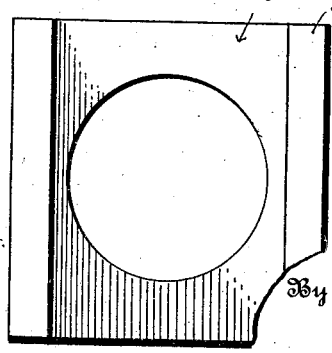
Inventor
J. W. Nippert.

UNITED STATES PATENT OFFICE.

JOHN W. NIPPERT, OF NEW BRIGHTON, PENNSYLVANIA.

NUT-LOCK.

1,079,714.　　　　　Specification of Letters Patent.　　Patented Nov. 25, 1913.

Application filed November 16, 1912. Serial No. 731,903.

*To all whom it may concern:*

Be it known that I, JOHN W. NIPPERT, a citizen of the United States, residing at New Brighton, in the county of Beaver and State of Pennsylvania, have invented certain new and useful Improvements in Nut-Locks, of which the following is a specification, reference being had to the accompanying drawings.

This invention relates to nut locks, and an object thereof is the provision of a device of this character in which the bolt is provided with a plurality of longitudinal grooves and the nut is provided with a seat for the reception of a locking plate, the locking plate being formed with tongues for engagement with the grooves in the bolt whereby the turning of the nut on the bolt will be prevented.

A further object of this invention is the provision of a nut lock in which the bolt is provided with a plurality of longitudinal grooves and the nut is formed with a seat in its outer face for the reception of a locking plate which is formed with inwardly extending tongues for engagement with the grooves in the bolt whereby the nut will be prevented from turning on the bolt, together with a jam nut for preventing the displacement of the locking plate from its seat in the nut.

With these and other objects in view, which will become fully apparent as the description proceeds, my invention resides in the novel construction, arrangement and combination of the parts, to be hereinafter more fully described, claimed and illustrated in the accompanying drawing, in which, Figure 1 is a side elevation of my device; Fig. 2 is a top plan view thereof; Fig. 3 is a section taken on the line 3—3 of Fig. 2; Fig. 4 is an elevation showing the locking plate; Fig. 5 is an elevation showing the seat in the nut, and Fig. 6 is a longitudinal section showing a slightly modified form of my invention.

Referring more particularly to the drawing, the numeral 1 indicates the bolt which is formed on one end with the usual head 2 and on its opposite end with threads 3. Longitudinal grooves 4 are formed in the threaded portion of the bolt, the grooves being arranged diametrically opposite each other. The nut 5 is formed in its outer face with a seat 6 for the reception of the locking plate 7, the locking plate being formed with a central opening 8 whereby it may be readily slipped upon the bolt. The plate is formed on its inner periphery with inwardly extending diametrically opposite tongues 9 which are adapted to engage in the grooves 4 in the bolt so that when the locking plate 7 is disposed in the seat 4 in the nut, the nut will be prevented from turning on the bolt. A jam nut 10 is threaded on the bolt and is adapted to bear against the locking plate 7 to prevent its displacement from the seats 6 in the nut. Pivotally mounted on the outer face of the jam nut is a lever 11 which is formed with an inwardly projecting nib 12 for engagement with one of the grooves formed in the bolt whereby the jam nut will be prevented from turning on the bolt. A flat spring 13 is secured to the outer face of the jam nut, the free end of which is curved and is adapted to bear against the cam shaped pivoted end 14 of the lever 11. A washer 15, which is composed of rubber, or other resilient material, is disposed between the jam nut 10 and the locking plate 7, the washer being adapted to wedge the threads of the jam nut against the threads of the bolt so as to prevent the turning of the jam nut on the bolt in the event that the lever 11 should become disengaged from the groove in the bolt.

In Fig. 6 of the drawings I have illustrated an alternative means for wedging the threads of the jam nut with those on the bolt, the jam nut being provided on its inner face with a circular seat 16, in which one end of a coil spring 17 is adapted to rest, the other end of the spring bearing against the outer face of the locking plate 7 when the nut lock is in position for use. It will be seen that the coil spring will react against the jam nut and serve to bind the threads of the jam nut against the threads of the bolt and prevent turning of the jam nut.

It will be, of course, understood that in case a very small nut lock is used only one longitudinal groove 4 will be necessary in the bolt and correspondingly only one tongue 9 on the locking plate 7. Of course in larger nut locks, two or more grooves and locking tongues may be used, as shown in the accompanying drawing.

From the above description taken in connection with the accompanying drawing it will be seen that I have provided a nut lock which comprises a minimum number of parts and which may therefore be cheaply manufactured and a nut lock which will fulfil all the requirements of such a device.

While the constructions illustrated in the accompanying drawing are the preferred embodiments of my invention, it will be understood that minor changes in construction may be made without departing from the spirit thereof or sacrificing any of its advantages as determined by the scope of the appended claims.

Having thus described my invention what I claim and desire to secure by Letters Patent is:

1. The combination with a bolt having a longitudinal groove therein, a nut, a locking plate bearing against said nut and having a tongue adapted for engagement in the groove in said bolt, a jam nut adapted to bear against said locking plate, and a resilient member disposed between said locking plate and said jam nut, as and for the purpose described.

2. The combination with a bolt having a longitudinal groove formed therein, a nut having a seat formed in its outer face, a locking plate disposed in said seat, said locking plate being formed with a tongue for engagement with the groove in said bolt, a jam nut adapted to bear against said locking plate, and a lever connected to said jam nut and adapted to engage in the groove in said bolt, as and for the purpose described.

3. In combination with a bolt having a longitudinal groove formed therein, a nut, a locking plate disposed on said nut, a jam nut adapted to bear against said locking plate, a lever pivotally mounted at one end upon the outer face of said jam nut, said lever being formed with an inwardly projecting tongue for engagement with the groove in said bolt, the pivoted end of said lever being cam-shaped, and a spring secured to the outer face of said jam nut, the free end of said spring being curved and adapted to bear against the cam-shaped end of said lever, as and for the purpose described.

4. In combination with a bolt having a longitudinal groove therein, a nut having a seat formed in its outer face, a locking plate disposed in said seat, said locking plate being formed with a tongue for engagement with the groove in said bolt, a jam nut adapted to bear against said locking plate, and means pivotally mounted on said jam nut for engagement with the groove in said bolt, as and for the purpose set forth.

5. The combination with a bolt having longitudinal grooves therein, a nut having a seat formed in its outer face, a locking plate disposed in said seat, said locking plate being formed with tongues for engagement with the grooves in said bolt, a jam nut adapted to bear against said locking plate, and resilient means disposed between said jam nut and said locking plate, as and for the purpose set forth.

In testimony whereof I hereunto affix my signature in the presence of witnesses.

JOHN W. NIPPERT.

Witnesses:
  E. H. WARD,
  H. W. HOUSEHOLDER,
  Mr. CUTHBUTSON.